May 14, 1935.  A. URFER  2,001,335
APPARATUS FOR MARKING DIALS OF INSTRUMENTS
Filed April 20, 1929

*INVENTOR.*
ADOLF URFER
BY
Cooper, Kerr & Dunham
ATTORNEYS.

Patented May 14, 1935

2,001,335

UNITED STATES PATENT OFFICE 2,001,335

APPARATUS FOR MARKING DIALS OF INSTRUMENTS

Adolf Urfer, Brooklyn, N. Y., assignor to Pioneer Instrument Company, Incorporated, Brooklyn, N. Y., a corporation of New York Application April 20, 1929, Serial No. 356,691

7 Claims. (Cl. 73—151)

This invention relates to apparatus for marking the dials of indicating instruments and it is applicable to the initial marking of graduations upon dials or for calibrating previously graduated or unmarked dials in association with any kind of indicating instrument.

Among the objects of this invention is to enable accurate marking and calibration of indicating instruments.

Another object of this invention is to provide novel apparatus for marking indicating instruments expeditiously and which is adapted to be used for marking a plurality of indicating instruments at one time without requiring any more effort on the part of an operator than would ordinarily be required in using the invention for the marking of but one indicating instrument.

Other objects and advantages will appear hereinafter in the accompanying description and claims.

In any kind of an indicating instrument, such as instruments for indicating air speed, revolutions per minute, rate of climb, altitude or pressure, it is particularly desirable that the graduations appearing upon the dials thereof are properly placed in order that true conditions may be indicated. In the manufacture of instruments in which precision is required it usually is necessary to mark graduations upon the dials of the instruments to correspond with known conditions. It is well known that no matter how skilled a mechanic might be and how standardized the materials of a particular indicating instrument might be, instruments designed for sensitive response are likely to show a difference in their indications when subjected to a common condition unless the instruments have been properly graduated.

One method of graduating instruments which has been practiced heretofore consists of subjecting an indicating instrument to a certain known condition; for example, a pressure gauge about to be graduated is connected onto a pressure line whose pressure may be determined by a manometer or standard pressure gauge. The pressure is then built up to a desired pressure, say five pounds per square inch, and while that pressure is maintained the instrument to be marked is tapped slightly in order that errors due to friction may be nullified. Then the operator places a mark with a pencil or stylus opposite the hand of the instrument being graduated and this mark is the graduation of this instrument for the pressure indicated by the standard instruments. The operator must be careful to apply the mark only when the desired pressure exists. For other graduations, the process is repeated. This method is slow and also has the disadvantage that changes in reading may take place during the period of marking.

My objective is to provide apparatus for enabling dials to be marked with precision and in such a manner that an operator may have his eye on a standard instrument when he causes the marking to take place. In a general way my invention involves the idea of burning marks upon the dial of an instrument by causing sparks to jump between a pin carried by an indicating hand and the dial of the instrument being graduated. The spark current is under the control of an operator who watches a standard instrument. Just prior to marking by the spark the operator causes a vibrator to tap the instrument board so that any errors due to friction which might effect the true reading of the instruments are eliminated. This apparatus has further advantages in that a plurality of indicating instruments may be graduated at one time as each graduation point is determined.

Figure 1:
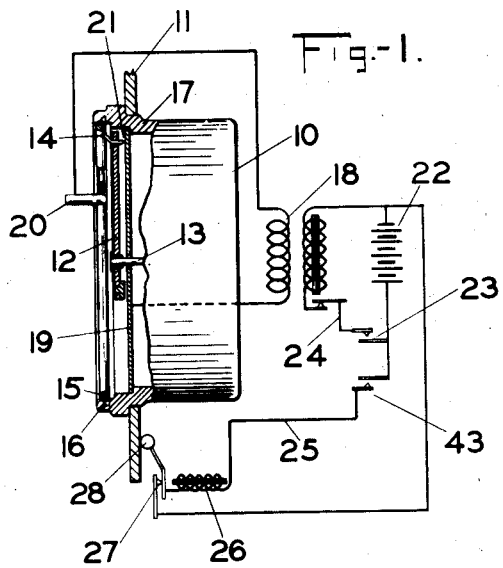
Fig. 1 illustrates a wiring diagram associated with one indicating instrument.

Referring more particularly to the drawing, Fig. 1 illustrates a wiring diagram connected for use in graduating one instrument. The character of the instrument is of no particular consequence and 10 designates any kind of indicating instrument. This instrument is mounted upon an instrument board or panel 11 where it may be readily observed and its reading compared with that of a standard instrument which is also preferably mounted upon the same board.

When an instrument is prepared for marking, its cover-glass is not in place and a hand 12 is placed upon the hand staff 13. This hand has a pin 14 near its free end and rather than provide an insulted bushing for the pin I make the hand out of some kind of insulation material. Pin 14 is an element in an electrical circuit but does not at any time contact with any element other than the insulation hand 12 upon which it is mounted. This hand is therefore free to rotate with the hand staff and there is no friction other than that which is inherent in the instrument and consequently present when the instrument is in practical use.

A ring 15 is placed in the snap-ring groove 16 of the instrument. In the instrument illustrated in Fig. 1 the casing 17 thereof is made of some insulating material such as a phenol condensate.

One terminal of a secondary coil 18 of an induction coil is connected with the dial 19 or to some part of the instrument which will enable current to be conducted to the dial. The other terminal of the secondary coil 18 is connected with ring 15 for which purpose there is a projection 20 at the end of the ring. Any type of induction coil may be used for the purpose of causing sparks to jump across the gap 21 between pin 14 and dial 19. The battery 22 and the switch 23 are connected in the primary coil circuit 24 of the induction coil and when conditions are correct the operator need only close switch 23 in order to cause sparking at the gap 21.

In order that friction errors may be nullified at the time of marking, I provide a circuit 25 including a vibrator having a coil 26 and a make-and-break contact 27 which controls the operation of a striker 28. This vibrator is so adjusted that striker 28 will strike against the instrument board 11 and repeatedly tap the same as long as the circuit 25 is energized. In Fig. 1 I have illustrated another switch 43 by which circuit 25 may be controlled. While two switches are not necessary, some operators might prefer to close circuits 23 and 25 simultaneously during the marking of certain types of instruments. Ordinarily a double-throw switch could be used to close successively circuit 25 and circuit 24. The type of vibrator may be of any well known kind and I have achieved satisfactory results with a simple type of electric bell vibrator.

Figure 2:
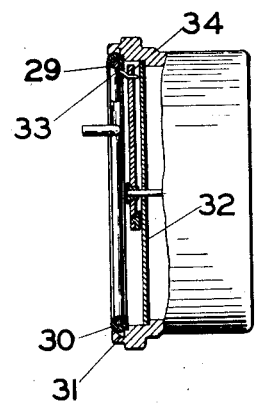
Fig. 2 is an elevation of an indicating instrument with a portion thereof cut away to illustrate how a dial may be marked when the case of the instrument is metallic.

The cases of some instruments are made of metal and for marking dials of such instruments ring 29 has a ring of insulating material 30, Fig. 2, placed between itself and the groove 31. When the ring 29 and the dial 32 are connected to opposite terminals of a circuit current will be caused to jump from the ring 29 to the pin 33, carried on insulated hand 34, and then to the dial 32 in the same manner as above described.

Figure 3:
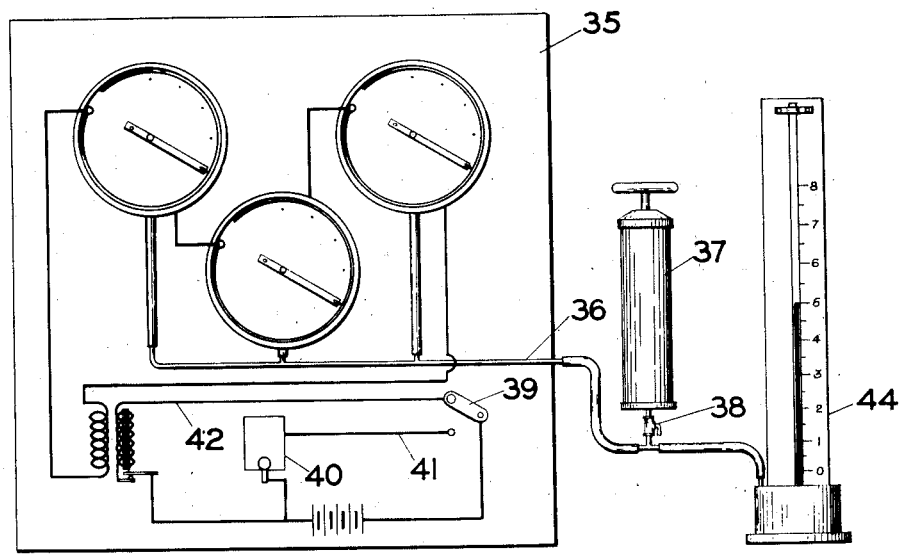
Fig. 3 is a wiring diagram illustrating the manner in which a plurality of indicating instruments may be marked at one time.

In Fig. 3 I have illustrated the appearance of a panel or instrument board 35 sufficiently large to accommodate three indicating instruments. These three instruments, together with the standard instrument 44 are subjected to the same conditions and in the present instance I have illustrated these instruments as being pressure gauges connected to a pressure line 36 which derives its pressure from a source of pressure or pump 37. A valve 38 may be provided for maintaining the pressure in the instruments at a desired reading. The wiring diagram illustrated in this figure is similar to the one illustrated in Fig. 1 except that the hands and dials of the instruments are connected in series with each other and in series with the secondary coil of the induction coil and a double-throw switch 39 is provided.

The vibrator 40 is mounted upon the instrument board 35. The double-throw switch 39 enables alternate energization of the vibrator circuit 41 and of the induction coil circuit 42, at will. It will be understood that an operator, in carrying out a graduation operation, will bring the indicator of the standard gauge (or other instrument) to a position indicating a certain degree of pressure and then while observing that the indicator of the standard instrument stays at this reading, causes first the vibrator to operate and then the induction coil circuit to be energized to cause marking of the dials of the various gauges. For a second operation the operator would increase the pressure in the line 36 to another known pressure and repeat the same procedure. The same series of operations are repeated for each different pressure within the range of the instruments being graduated.

The jumping of sparks across the pin and dial gap will cause a slight burning of the surface of the dial which may afterwards be used as a reference point for applying the final graduation mark. It will also be appreciated that if it is desired to mark a paper disk, the face of the dial could be covered with the paper disk and the same method could be utilized for marking the paper disk. With a paper disk in place the spark would jump from the pin to the metallic dial and pass through the paper leaving therein a minute perforation and a slightly scorched mark by which the perforation may be located. Whether the invention is to be used in connection with marking a single metal disk or a plurality of metal disks, or a paper disk must be given consideration in the choice of the electrical means used and the voltage desired of the induction coil.

What I claim is:

1. The combination with an indicating instrument having a hand and a hand staff carrying the hand and a dial to be marked, of apparatus for marking the dial of said instrument to calibrate the latter comprising a ring of conducting material mounted opposite the face of said dial, a pin mounted upon the hand and insulated from the hand staff of the instrument, said pin being in proximity to said ring and dial as the hand staff is rotated, and means for causing current to flow between said ring, pin and instrument dial.

2. The combination with an indicating instrument having an insulating hand and a hand staff carrying the hand and a dial to be marked, of apparatus for marking the dial of said instrument comprising a ring of conducting material mounted opposite the face of said dial, a pin mounted upon the hand and insulated from the hand staff of the instrument, said pin being in proximity to said ring and dial as the hand staff is rotated, and circuit means including an induction coil with the terminals of the secondary coil thereof connected, respectively, to said ring and instrument dial.

3. The combination with an indicating instrument having a hand and hand staff on which the hand is mounted and a dial to be marked, of apparatus for marking the dial of said instrument comprising a pin mounted upon the hand of the instrument and out of electrical contact with the dial, and electrical means including a circuit having as parts thereof, the pin and dial, there being a gap between said pin and dial, the latter two being so related and arranged that an electric spark may jump across said gap, means for energizing said circuit to cause sparking at said gap, and means for vibrating the instrument.

4. The combination with an indicating instrument having a dial to be marked, of apparatus for marking the dial of said instrument comprising a conducting ring disposed in front of the dial of the instrument, a hand staff and hand, a pin mounted on said hand and spaced from the dial of the instrument, said pin and dial being so related that an electric spark may jump therebetween, a sparking circuit having connection with said ring and dial and including the gap between the pin and dial, and means for vibrating the instrument.

5. The combination with a plurality of indicating instruments having dials to be marked, of apparatus for marking the dials of all of said instruments concomitantly for different degrees of condition comprising a panel for supporting said instruments, means for causing vibration of said panel and instruments at will, a source adapted to create conditions which the instruments are adapted to indicate, said source having connection with each of said instruments, a standard instrument also having connection with said source of condition, a pin carried by the hand of each of the instruments to be marked, each pin being insulated from the remaining portions of its associated instrument, the pin and dial of each instrument being spaced to form a spark gap, circuit means including a secondary coil in electrical connection with the spark gaps of said several instruments, and means for controlling the operation of said first named means and the flow of current in said circuit means at will.

6. Apparatus for marking the dial of an indicating instrument having a hand, comprising means for subjecting said indicating instrument to a known condition which the instrument is to be adapted to subsequently indicate when unknown, electrically operated means for causing vibration of the instrument, and electric sparking means movable with the instrument hand in accordance with the known condition for marking an indication upon the face of the dial of the instrument opposite the instrument hand.

7. Apparatus for marking the dial of an indicating instrument having a hand, comprising means for subjecting said indicating instrument to a known condition which the instrument is to be adapted to subsequently indicate when unknown, and electric sparking means movable with the instrument hand for marking an indication upon the face of the dial at the will of the operator.

ADOLF URFER.